United States Patent [19]

Afzali-Ardakani et al.

[11] Patent Number: 5,554,717
[45] Date of Patent: Sep. 10, 1996

[54] SYNTHESIS OF POLYANILINES AND ITS CO-POLYMERS BY MELT CONDENSATION

[75] Inventors: Ali Afzali-Ardakani, Yorktown Heights, N.Y.; Jeffrey D. Gelorme, Plainville, Conn.

[73] Assignee: International Business Machines Corporation, Armonk, N.Y.

[21] Appl. No.: 544,902

[22] Filed: Oct. 18, 1995

[51] Int. Cl.⁶ .................................................. C08G 12/00
[52] U.S. Cl. ........................ 528/229; 528/222; 528/224; 528/226; 528/481; 528/491; 528/503
[58] Field of Search .................................. 528/222, 224, 528/226, 229, 481, 491, 503

[56] References Cited

U.S. PATENT DOCUMENTS

| | | | |
|---|---|---|---|
| 4,008,999 | 2/1977 | Kalopissis et al. | 8/10.2 |
| 4,076,529 | 2/1978 | Fleckenstein et al. | 96/3 |
| 4,084,052 | 4/1978 | Bugaut et al. | 544/165 |
| 4,204,059 | 5/1980 | Bugaut et al. | 544/166 |
| 4,221,729 | 9/1980 | Kalopissis et al. | 552/302 |
| 4,260,749 | 4/1981 | Bugaut et al. | 544/166 |
| 4,499,304 | 2/1985 | Gabrielsen et al. | 564/92 |
| 4,845,293 | 7/1989 | Junino et al. | 564/441 |
| 5,514,819 | 5/1996 | Vanmaele | 552/302 |

*Primary Examiner*—Samuel A. Acquah
*Attorney, Agent, or Firm*—Thomas A. Beck

[57] ABSTRACT

Synthesis of crystalline polyaniline, its derivatives and its co-polymers with other conjugated monomers by melt polycondensation of bifunctional starting materials having a quinone and N-protected amine group, and conversion of such polycondensation polymers to corresponding doped and conductive form of said polymers.

16 Claims, No Drawings

SYNTHESIS OF POLYANILINES AND ITS CO-POLYMERS BY MELT CONDENSATION

FIELD OF THE INVENTION

A novel method and starting materials by which pure crystalline polyanilines or its co-polymers with other conjugated monomers are obtained by self condensation of said starting materials.

BACKGROUND OF THE INVENTION

Electrically conducting organic polymers have been of scientific and technological interest since the late 1970's. These relatively new materials exhibit the electronic and magnetic properties characteristic of metals while retaining the physical and mechanical properties associated with conventional organic polymers.

Technological application of these polymers are beginning to emerge. Today, conductive polymers and composites such as mentioned above have a broad range of applications including their use as materials for carders of electrically sensitive devices which prevent electrostatic charge (ESC) which may attract airborne particles on critical surfaces and electrostatic discharge (ESD) which may cause device malfunction. In addition, conducting polymers can be used as machine covers for electronic equipment which prevent the ingress or egress of electromagnetic signals in order to meet the guidelines established by the FCC as to the accepted levels of unwanted electrical noise.

The materials currently in use are rendered conductive through the use of conductive fillers like metal, carbon particles or chemicals such as ionic salts. The problems associated with these materials include high cost, sloughing of the filler, dependency on environmental conditions, and a very high surface resistance.

Polyanilines are known to be a class of soluble, processable electrically conducting organic polymers. This family of polymers displays a range of solubilities in organic and aqueous acid solutions. Polyanilines are rendered conducting by treatment with cationic reagents (Lewis acids), most commonly protonic acids. Also the polyaniline can be doped by taking the non-conducting form of the polymer and amine triflate salts (which thermally generate acid) and mildly heating them together in the form of a film or in solution, example Although polyaniline is very inexpensive to produce, some of its physical properties such as the impact strength, tensile strength, etc., may limit the full scope of its uses. The techniques disclosed in prior art references are completely different from the present invention.

One application of the polymer in the prior art uses polydopants, for example, polyimide precursors such as the polyamic acid (—COOH) form (with a high molecular weight as made) as direct dopants for the polyaniline to obtain conducting blends of the two polymers in one step. In the case of polyamic acid, the polyaniline becomes protonated by the polyamic acid.

Also, in the prior art, an anhydride reacted polyaniline is blended with polyimides. By contrast, in another prior art reference, a conductive blend is obtained in a single step due to the interaction between the polydopant (polyamic acid) and the conducting polymer leading to a compatible conducting polymer blend. The resultant blend in the present invention has dispersion at a molecular scale as opposed to the prior art wherein the dispersion is at a much comer scale. The references cited do not disclose formation of a conducting complex or blend with the polyamic acid but rather the polyaniline is reacted with anhydrides first to obtain a product, and thereafter, this product is blended with another polyimide.

Another reference uses polydopants, such as Brønsted acid (protonic) polymers. Examples of such polydopants are: polyacrylic acid, polysulfonic acid, cellulose sulfonic acid, polyamic acid, photosensitive polyamic acid, polyphosphoric acid, acid chloride (—COCl) containing polymers and sulfonyl chloride (—SO$_2$Cl) containing polymers. The advantage of the use of such materials are that no external corrosive monomeric or oligomeric dopants are necessary; there is high thermal and electrical stability due to the polymeric counteranion; and there is enhanced processability. It is important to note that because of the interaction of the two polymers as stated above, compatible molecularly mixed blends are formed wherein there is no phase separation. Finally, the solution gels over time which allows the formation of highdraw ratio fibers.

Electrically conducting organic polymers have been of scientific and technological interest because these relatively new materials exhibit the: electronic and magnetic properties characteristic of metals while retaining the physical and mechanical properties associated with conventional organic polymers.

More specifically, polyaniline has become especially important among conductive polymers because its doped conductive form is environmentally stable. Ever since the discovery that the acid salt of polyaniline exhibits electrical conductivity, much effort has been directed to increase the conductivity and tractability of polyaniline.

These efforts have generally centered on the optimization of the water based oxidative coupling of aniline and its derivative and post processing of the polymer obtained by this method. This method is illustrated by the equation as set forth in Reaction I below.

REACTION I

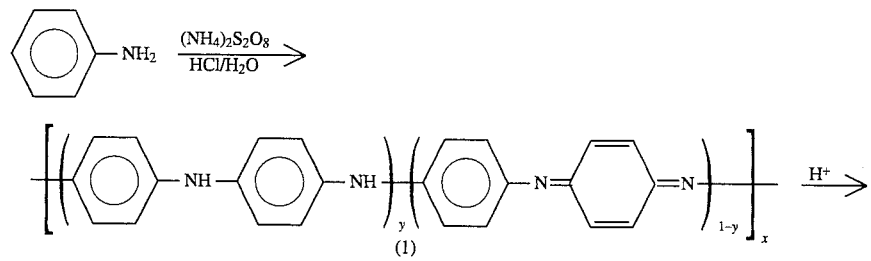

-continued
REACTION I

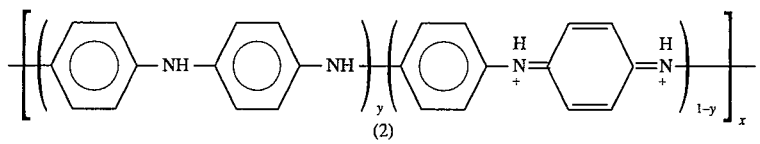

In the oxidative coupling approach, aniline or its derivatives are dissolved in aqueous acid solution and treated with electron transfer oxidizing agents such as ammonium persulfate. The polyaniline thus formed has an electrical conductivity in the range of about 0.1 to 10 S/cm; and because of the presence of free radicals and the mechanism of the coupling reaction, crosslinks and defects are likely to be introduced into the polymer chain which results in reducing its crystallinity and conductivity. The efforts to improve the conductivity of polyaniline has been directed generally toward increasing the crystallinity of the latter by mechanical stretching and/or choice of dopants and additives such as listed above.

Technological application of these polymers are beginning to emerge. These polymers are electrically conductive substituted and unsubstituted polyanilines, substituted and unsubstituted polyparaphenylenes, substituted and unsubstituted polyparaphenylenevinylenes, substituted and unsubstituted polythiophenes, substituted and unsubstituted polyazines, substituted and unsubstituted polyfuranes, substituted and unsubstituted polypyrroles, substituted and unsubstituted polyselenophenes, substituted and unsubstituted polyphenylene sulfides and substituted and unsubstituted polyacetylenes formed from soluble precursors. Blends of these aforementioned polymers are suitable for use as are copolymers made from the monomers used to form these polymers.

The articles entitled *Polyaniline; Processability From Aqueous Solutions and Effective Water Vapor on Conductivity* to M. Angelopoulos et al., Synthetic Metals, 21 (1987) pp.21–30, and the article entitled *Polyaniline: Solutions, Films, Oxidation State* to M. Angelopoulos et al., Mol. Cryst. Liq. Cryst. 160–151 (1988), describe a chemically synthesized emeraldine base form of polyaniline which is soluble in various solvents. The emeraldine base is doped by reacting, the emeraldine powder or film with aqueous acid solution for several hours, for example, aqueous acetic acid or aqueous HCl.

Electrically conducting polymers are described in detail U.S. Pat. No. 5,198,153 noted above and U.S. application Ser. No. 08/118,475.

Conducting polymers can be conveniently employed in applications where the use of metal would be too expensive or inappropriate due to processing considerations. Such applications generally require that the physical properties of the interconnect material impart resiliency, high initial and ultimate adhesion as well as corrosion resistance and especially flexibility. The combination of such properties is difficult to achieve with an all metal connection.

SUMMARY OF THE INVENTION

The present invention relates to the synthesis of crystalline polyaniline, its derivatives and its co-polymers with other conjugated monomers by melt poly-condensation of new bi-functional starting materials having a quinone and N-protected amine group.

The invention further relates to synthesis of the starting materials and also relates to conversion of polymers prepared in accordance with the present invention to corresponding "doped" and conductive form of said polymers.

DESCRIPTION OF THE PREFERRED EMBODIMENTS

The simplest bifunctional starting material which can undergo polycondensation to polyaniline, is the N-tert-butyloxycarbonyl-indo aniline (N-Boc-indoaniline). This compound was synthesized in one step from N-Boc-phenylenediamine and benzoquinone in the presence of a dehydrating agent. The reaction takes place at between about 0° and 10° C. and the product is isolated as a dark red solid. Reaction II proceeds as follows:

REACTION II

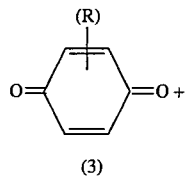

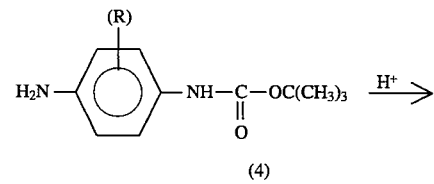

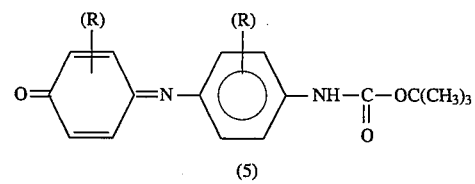

Alternatively, this procedure could be applied to other N-protected aromatic diamines and substituted quinones as shown in Reaction III, where substituted quinones having the general formula (6) reacts with any N-protected aromatic diamine having the general formula (7) under the reaction conditions listed for Reaction II above to give a bifunctional monomer having the general formula (8).

The substitution on benzoquinone (6) can be: alkyl, alkylaryl, vinyl, alkynyl, alkoxy, alkylthio, alkylsilyl, aryloxy, dialkysubstituted amines and halogens (chlorine, bromine, fluorine and iodine; or the quinone can be selected from the class of naphthoquinone and anthraquinone and their substituted derivatives, where the substituents can be alkyl, alkylaryl, vinyl, alkynyl, alkoxy, alkylthio, alkylsilyl, aryloxy, dialkysubstituted amines and halogens (chlorine, bromine, fluorine and iodine). The substituted benzoquinone reacts as follows.

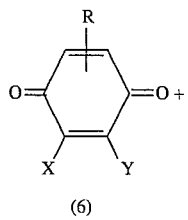

(6)

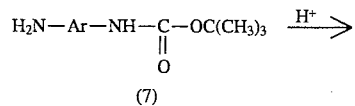

(7)

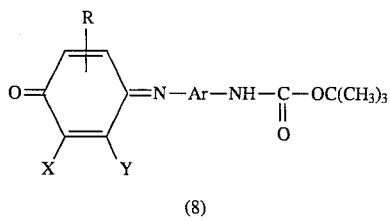

(8)

With respect to the N-protected aromatic diamine (7) the Ar- can be selected from the group consisting of: a substituted phenylene wherein the substituents are selected from the group consisting of: alkyl, aryl, vinyl, alkynyl, alkoxy, alkylthio, alkylsilyl, aryloxy, dialkysubstituted amines, halogens (chlorine, bromine, fluorine and iodine) and dialkylamino; or, the aromatic moiety can be any of the following and their substituted derivatives:

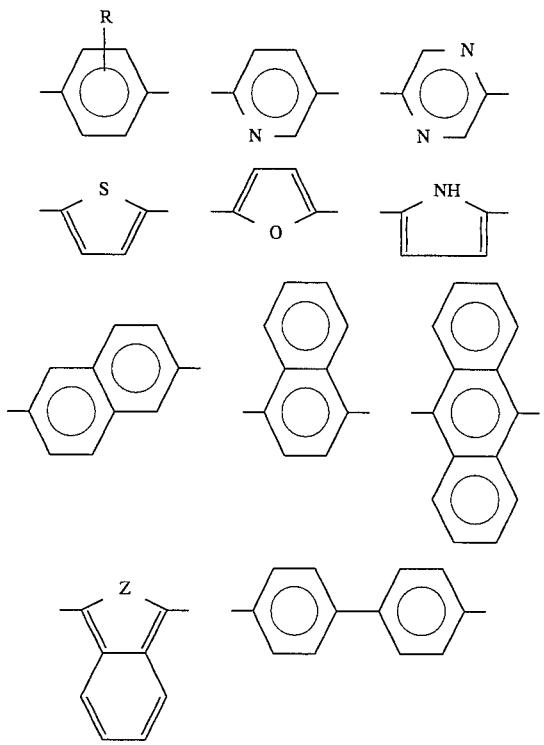

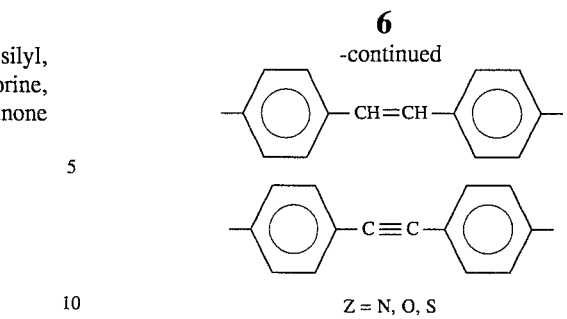

Z = N, O, S

The bifunctional monomer (5) which melts at 110° C. shows a sharp exotherm in its differential scanning colorimetric analysis shown in FIG. 1 which is a good indication of the self-condensation reaction of the latter. When N-Boc-indoaniline (5) was heated (See Reaction III) above its melting point at the onset of exotherm (about 180° C.) its color changes almost instantaneously from dark red to violet-blue.

Bifunctional monomer may also be polymerized in a solution of high boiling point solvents, i.e. solvents which have a boiling point greater than the onset of the temperature at which polymerization occurs. Suitable solvents are N-methyl pyrrolidone (NMP), meta-cresol, Dimethylsulfoxide (DMSO).

Spectroscopic analysis of the violet-blue product revealed that it is "pemigraniline" end-capped with quinone and N-protected amine group. The UV spectra as shown in FIG. 2 and FIG. 3 of the pemigraniline were very similar to spectra reported for pemigraniline produced by the oxidative coupling reaction of aniline. The molecular weight of the end—capped pemigraniline can be easily controlled by time-temperature parameters; at which the N-Boc-indoaniline is subjected and the average molecular weight can be estimated from the quantitative analysis of the residual end group absorption peak in its IR spectrum as shown in FIG. 3, or example, when a thin film of (5) on a substrate was heated to 180° C. for about 10 minutes, the average molecular weight of the polymer was estimated to be about 7000 to 8000, whereas when the monomer was heated at 200° C. for 120 minutes, the molecular weight was increased to about 50,000.

REACTION III

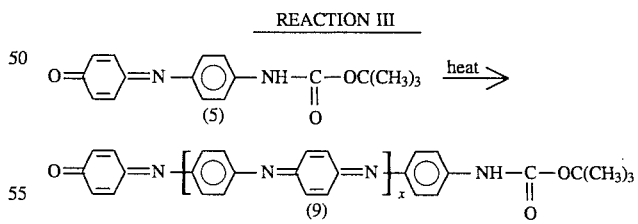

The same approach can be used to obtain derivatives or co-polymers of polyaniline by choosing different starting materials as depicted in the examples set forth above. The following reaction (Reaction IV) is an example that a co-polymer of aniline containing heterocycle can be easily obtained by selecting a N-Boc-diaminoheterocycle in place of the N-Boc-phenylenediamine.

REACTION IV

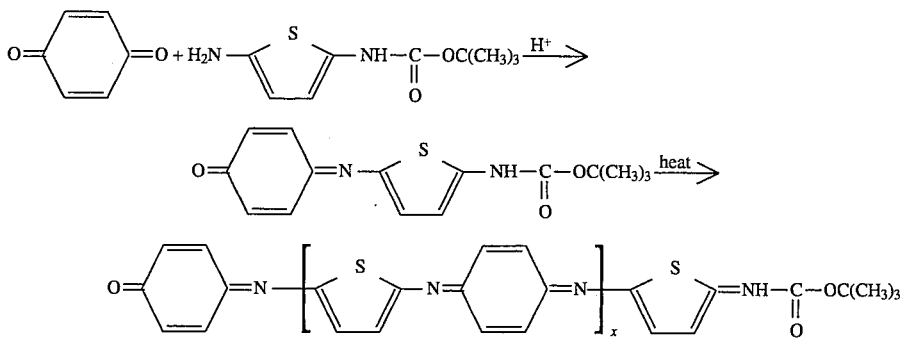

In general, the starting materials of general formula (9) can be used in a self-condensation reaction to obtain polyanilines or copolymers of aniline as depicted in Reaction V as follows:

REACTION V $(9) \xrightarrow{\text{heat}}$

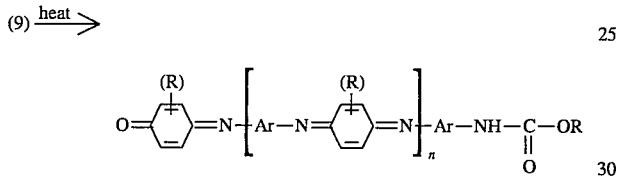

The monomeric difunctional compound of formula (5) above or of the general formula (8) can be applied to a substrate both as a solution in an organic solvent by standard methods of coating such as spin coating or doctor blading, or it could be applied as a neat liquid above its melting point and below the onset of the exotherm. An alternative approach is to make a low molecular weight oligomer of the N-Boc-indoaniline (See Reaction III, where x=2–10) by heating at onset temperature for a very short period of time, (e.g. a few seconds), and then use the oligomer for coating on a desired substrate and further heating to get the polymer where x=10–10,000. The advantage of this approach is that the organic solution of the starting material is made more viscous which is necessary for controlling the thickness and uniformity of the thin film coatings.

The polyaniline formed by this method due to the, lack of any impurity and byproducts and the nature of the reaction is highly crystalline. It is noted that the two side products of the self-condensation reaction namely carbon dioxide and isobutylene are gases which are removed from the polymer during heating. In addition, since the molecular weight of the polymer, as was mentioned above, can be easily controlled to obtain products ranging from oligomers to a very high molecular weight polymer just by increasing the temperature, makes this approach far superior to the conventional wet oxidative coupling of aniline or its derivatives. The end capped pemigraniline (9) formed in this reaction is converted to other forms (lower oxidation states) of aniline either by chemical reaction with hydrazine or its derivatives, or electrochemical reduction. Subsequent doping of the emeraldine base [See (1) where x=0.5] formed from the reaction of (9) leads to highly conductive aniline.

The invention is exemplified in the following example.

EXAMPLE

This example illustrates the synthesis of N-Boc-indoaniline (5). One ml of trifluoroacetic acid was added to an ice cold solution of N-Boc-phenylenediamine [2 mole] and benzoquinone [10 mole] in 1000 ml of tetrahydrofuran. The reaction mixture was stirred at this temperature for 30 minutes whereupon anhydrous potassium carbonate was added and stirred in for an additional 10 minutes. The solution was filtered and the filtrate was evaporated at reduced pressure. The residue was chromatographed on a column of silica gel and the N-Boc-indoaniline (5) was isolated as a dark red solid, m.p.=112° C.

Polycondensation.: A solution of N-Boc-indoaniline (200 mg) in 5 ml of butyrolactone was spin coated on a quartz substrate to a thickness of 100 nm and after evaporation of the solvent by heating the substrate at 80° C., the thin film was heated in a convection oven at 180° C. for 10 mutes to obtain low molecular weight end capped polyaniline. Further heating of the same substrate at 200° C. for 10 minutes resulted in a high molecular weight polyaniline end capped with quinone and carbamate group.

Other objects and features as well as additional details of the present invention will become apparent from the following detailed description and annexed drawings of the presently preferred embodiments thereof, when considered in conjunction with the associated drawings.

Thus, while there have been shown and described and pointed out fundamental novel features of the invention as applied to currently preferred embodiments thereof, it will be understood that various omissions and substitutions and changes in the form and details of the method and apparatus illustrated, and in their operation, may be made by those skilled in the art without departing from the spirit of the invention. In addition it is to be understood that the drawings are not necessarily drawn to scale but that they are merely conceptual in nature. It is the intention, therefore, to be limited only as indicated by the scope of the claims appended herewith.

What we claim and desire to protect by Letters Patent is:
1. A method comprising the steps of:

providing a first compound having the structural formula:

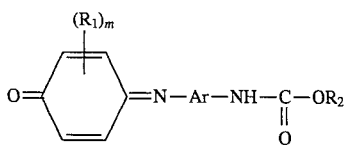

providing energy to polymerize said first compound to a second compound having the structural formula:

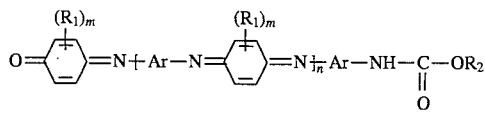

wherein quinone can also be naphthoquinone and anthraquinone and their substituted derivatives, where said substituents are alkyl, alkylaryl, vinyl, alkynyl, alkoxy, alkylthio, alkylsilyl, aryloxy, dialkysubstituted amines, chlorine, bromine, fluorine or iodine;

Ar is selected from the group consisting of a substituted phenylene wherein the substituents are selected from the group consisting of alkyl, aryl, vinyl, alkynyl, alkoxy, alkylthio, alkylsilyl, aryloxy, dialkysubstituted amines, chlorine, bromine, fluorine, iodine and dialkylamino;

$R_1$ is an alkyl, alkylaryl, vinyl, alkynyl, alkoxy, alkylthio, alkylsilyl, aryloxy, dialkysubstituted amines, chlorine, bromine, fluorine and iodine;

m is 0 to 4;

n is 1 or greater;

"alkyl" where referred to above is 1–18 carbon atoms;

$R_2$ is a heat induced leaving group which generates a proton and catalyzes the condensation reaction.

2. The method of melt polymerizing to form polyaniline defined in claim 1 comprising:

combining a N-substituted phenylene diamine having a phenyl ring which is substituted or unsubstituted and benzoquinone having a quinone ring which is substituted or unsubstituted in a solution containing acid and dehydrating agents to form N-substituted indoaniline having a phenyl ring and a quinone ring which are substituted or unsubstituted;

heating said condensed product to at least about 180° C. to polymerize said indoaniline to form a polyaniline.

3. The method of melt polymerizing to form polyaniline defined in claim 2 wherein said combination of compounds is heated to a temperature greater than 180° C. to increase the molecular weight of said polyaniline.

4. The method of melt polymerizing to form polyaniline defined in claim 3 wherein said heat induced leaving group is selected from the group consisting of is isobutyl, secondary butyl, tertiary butyl.

5. The method of melt polymerizing to form polyaniline defined in claim 4 wherein said polyaniline possesses a crystalline form.

6. The method of melt polymerizing to form polyaniline defined in claim 4 wherein said polyaniline possesses a controlled molecular weight as a result of time and temperature control.

7. The method of melt polymerizing to form polyaniline defined in claim 4 wherein said solution has a boiling point higher than the onset of the temperature at which polymerization occurs.

8. The method of melt polymerizing to form polyaniline defined in claim 4 wherein said solution is selected from the group consisting of N-methyl pyrrolidone, meta-cresol and dimethyl sulfoxide.

9. The method of melt polymerizing to form polyaniline defined in claim 4 wherein the polyaniline formed is reduced to lower its oxidation state to form emeraldine.

10. The method of melt polymerizing to form polyaniline defined in claim 4 wherein the polyaniline formed is reduced to lower its oxidation state, to form leucoemeraldine.

11. The method of preparing emeraldine defined in claim 9 wherein said emeraldine is doped to form a conductive polymer.

12. The method of preparing leucoemeraldine defined in claim 7 wherein said leucoemeraldine is doped to form a conductive polymer.

13. A polyaniline composition of matter comprising:

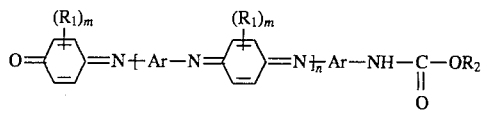

wherein quinone may be naphthoquinone and anthraquinone and their substituted derivatives, where said substituted derivatives are alkyl, alkylaryl, vinyl, alkynyl, alkoxy, alkylthio, alkylsilyl, aryloxy, dialkysubstituted amines, chlorine, bromine, fluorine or iodine;

Ar is selected from the group consisting of a substituted phenylene wherein the substituents are selected from the group consisting of alkyl, aryl, vinyl, alkynyl, alkoxy, alkylthio, alkylsilyl, aryloxy, dialkysubstituted amines, chlorine, bromine, fluorine, iodine and dialkylamino;

$R_1$ is an alkyl, alkylaryl, vinyl, alkynyl, alkoxy, alkylthio, alkylsilyl, aryloxy, dialkysubstituted amines, chlorine, bromine, fluorine and iodine;

m is 0 to 4;

n is 1 or greater;

"alkyl" where referred to above is 1–18 carbon atoms; and $R_2$ is a heat induced leaving group which generates a proton and catalyzes the condensation reaction.

14. The method of melt polymerizing to form polyaniline defined in claim 12 wherein said heat induced leaving group is selected from the group consisting of is isobutyl, secondary butyl, tertiary butyl.

15. The polyaniline composition defined in claim 13 having a % crystallinity greater than about 10%.

16. The polyaniline composition defined in claim 13 wherein Ar is any of the following and their substituted derivatives:

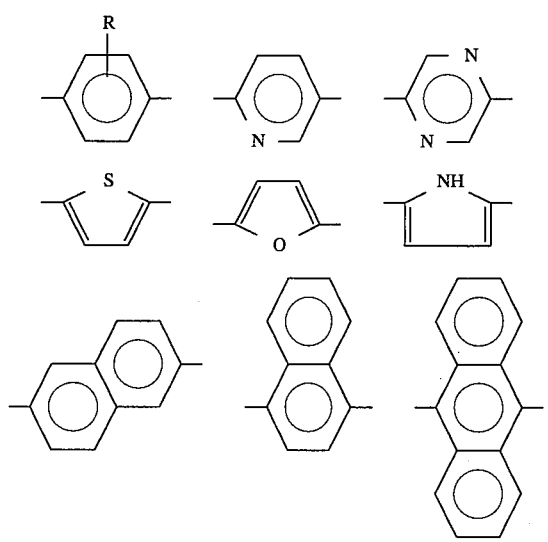
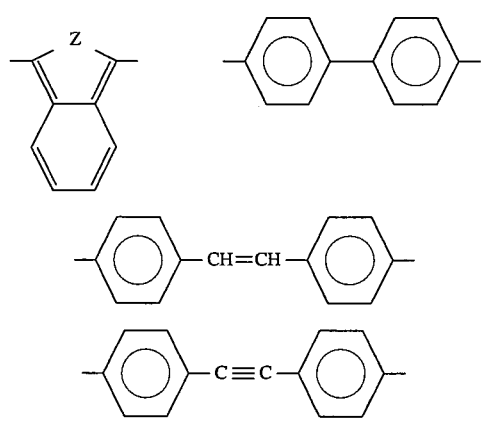
Z = N, O, S
* * * * *